(12) United States Patent
Nakano et al.

(10) Patent No.: US 8,598,762 B2
(45) Date of Patent: Dec. 3, 2013

(54) PERMANENT MAGNET ROTATING ELECTRIC MACHINE AND ELECTRIC POWER STEERING DEVICE USING THE SAME

(75) Inventors: Masatsugu Nakano, Tokyo (JP); Kazuhisa Takashima, Tokyo (JP); Satoru Akutsu, Tokyo (JP); Yoshihito Asao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 65 days.

(21) Appl. No.: 12/391,573

(22) Filed: Feb. 24, 2009

(65) Prior Publication Data

US 2009/0251023 A1    Oct. 8, 2009

(30) Foreign Application Priority Data

Apr. 4, 2008    (JP) ................................ 2008-098143

(51) Int. Cl.
  *H02K 21/16*    (2006.01)

(52) U.S. Cl.
  USPC .............. 310/156.45; 310/156.28; 310/156.46

(58) Field of Classification Search
  CPC ..................................................... H02K 1/278
  USPC ............... 310/156.45, 156.46, 156.38, 56.28, 310/156.21, 156.23, 156.28, 156.19
  See application file for complete search history.

(56) References Cited

U.S. PATENT DOCUMENTS 5,886,440 A * 3/1999 Hasebe et al. ........... 310/156.19
6,597,078 B2 * 7/2003 Crapo et al. ............. 310/156.01
7,741,747 B2 * 6/2010 Yamamura et al. ...... 310/156.28
2002/0067092 A1 * 6/2002 Crapo et al. ............. 310/156.47
2005/0110356 A1 * 5/2005 Imamura et al. ........ 310/156.53

(Continued)

FOREIGN PATENT DOCUMENTS

JP    1-286758    11/1989
JP    5-48552    6/1993

(Continued)

OTHER PUBLICATIONS

Shimizu et al, JP 2003299279 A Machine Translation, Oct. 2003.*

(Continued)

*Primary Examiner* — Burton Mullins
*Assistant Examiner* — Eric Johnson
(74) *Attorney, Agent, or Firm* — Oblon, Spivak, McClelland, Maier & Neustadt, L.L.P.

(57) ABSTRACT

A permanent magnet rotating electric machine includes: a stator including: a stator core having teeth, and an armature winding wound around each of the teeth to configure the multiple phases; and a rotor including a rotor core, and permanent magnets provided in order around the rotor core. The rotor is arranged to be spaced apart from the stator with an air gap therebetween. Each of the permanent magnets has a curved surface opposed to the stator and is configured to satisfy the following relationship:

$$0.65 \leq \frac{Rm \times h1}{W(h1 + g)} \leq 1.37$$

where Rm denotes a radius of curvature of the curved surface, h1 denotes a thickness of a central portion of the permanent magnet in the peripheral direction, W denotes a width of the permanent magnet in the peripheral direction, and g denotes an air gap length of the air gap.

15 Claims, 10 Drawing Sheets

(56) References Cited

U.S. PATENT DOCUMENTS

| | | | |
|---|---|---|---|
| 2005/0269895 A1* | 12/2005 | Innami et al. | 310/218 |
| 2007/0205688 A1* | 9/2007 | Murakami et al. | 310/156.28 |
| 2007/0296297 A1* | 12/2007 | Jones et al. | 310/156.28 |
| 2008/0055032 A1* | 3/2008 | Miyata | 335/306 |
| 2009/0146517 A1* | 6/2009 | Tresch | 310/156.28 |

FOREIGN PATENT DOCUMENTS

| | | | | |
|---|---|---|---|---|
| JP | 06165461 A | * | 6/1994 | H02K 29/00 |
| JP | 6-217478 | | 8/1994 | |
| JP | 09093844 A | * | 4/1997 | H02K 1/27 |
| JP | 2000-350393 | | 12/2000 | |
| JP | 2002-262533 | | 9/2002 | |
| JP | 2003299279 A | * | 10/2003 | H02K 1/27 |
| JP | 2004-208341 | | 7/2004 | |
| JP | 2004254446 A | * | 9/2004 | H02K 15/03 |
| JP | 2004343817 A | * | 12/2004 | H02K 15/03 |
| JP | 2005-341688 | | 12/2005 | |
| JP | 2006-304407 | | 11/2006 | |
| JP | 2006-320135 | | 11/2006 | |
| JP | 2007-221961 | | 8/2007 | |
| JP | 2007-318998 | | 12/2007 | |

OTHER PUBLICATIONS

Shibata, JP 2004343817A Machine Translation, Dec. 2004.*
Lee, KR1020070023076 English Translation, Feb. 2007.*
Sasaki et al, JP06165461A Machine Translation, Jun. 1994.*
Uchida et al, JP09093844A Machine Translation, Apr. 1997.*
U.S. Appl. No. 12/351,244, filed Jan. 9, 2009, Nakano, et al.
U.S. Appl. No. 12/994,772, filed Nov. 26, 2010, Nakano, et al.
Japanese Office Action with English translation mailed Jul. 31, 2012, in Japanese Patent Application No. 2008-098143, filed Apr. 4, 2008.

* cited by examiner

PERMANENT MAGNET ROTATING ELECTRIC MACHINE AND ELECTRIC POWER STEERING DEVICE USING THE SAME

BACKGROUND OF THE INVENTION

1. Field of the Invention

The present invention relates to a permanent magnet rotating electric machine, and more particularly to a motor for use in an electric power steering device for automobile, for example.

2. Description of the Related Art

In the related-art permanent magnet rotating electric machine, a torque pulsation called a cogging torque occurs due to an interaction between a stator core and a permanent magnet. Since the cogging torque causes vibration, it is strongly desired to decrease the cogging torque. Therefore, various techniques for decreasing the cogging torque have been proposed, and the configuration of permanent magnet to decrease the cogging torque has been examined. For example, as one example of a motor having twelve permanent magnets and nine magnetic poles, the curved surface of permanent magnet opposed to a stator is like a circular arc, the value of the radius of a rotor divided by the curvature of the surface of permanent magnet opposed to the stator is set to the value for decreasing the cogging torque (e.g., refer to JP-A-2005-341688, page 3-4, FIGS. 3 and 4). Also, a permanent magnet motor in which the number of poles is 6 and the number of teeth is 18 has the center of outer diameter eccentric so that the outer diameter of permanent magnet passing the outside contour may be smaller than the outer diameter of adjacent permanent magnet passing the vertex of contour, and the surface shape of the rotor is like a petal (e.g., refer to JP-A-2000-350393, page 3, FIG. 1).

In the related-art permanent magnet rotating electric machine, though the cogging torque can be decreased by making the curved surface of permanent magnet opposed to the stator like a circular arc, there is a problem that the height of the end portion of permanent magnet in the peripheral direction is smaller, whereby the irreversible demagnetization at the end portion of permanent magnet in the peripheral direction is likely to occur. When the permanent magnet rotating electric machine operates at the high temperature, there is another problem that the irreversible demagnetization is more likely to occur because the coercive force of permanent magnet is decreased. If the irreversible demagnetization occurs, the torque is decreased, and the cogging torque and the torque ripple are increased because the magnetic flux produced by the permanent magnet is different from at the time of design, causing the vibration or noise. Therefore, if it is used for the electric power steering device for automobile, the good steering feeling can not be obtained.

SUMMARY OF THE INVENTION

This invention has been made to solve the above-mentioned problems, and it is an aspect of the present invention to provide a permanent magnet rotating electric machine in which the cogging torque is decreased and also the irreversible demagnetization is decreased.

An embodiment of the present invention provides a permanent magnet rotating electric machine including: a stator including a stator core having a plurality of teeth, and an armature winding wound around each of the plurality of teeth to configure the multiple phases; and a rotor including a rotor core, and a plurality of permanent magnets provided in order in a peripheral direction around the rotor core. The rotor is arranged to be spaced apart from the stator with an air gap therebetween. Each of the permanent magnets has a curved surface opposed to the stator and is configured to satisfy the following relationship:

$$0.65 \leq \frac{Rm \times h1}{W(h1 + g)} \leq 1.37$$

where $Rm$ denotes a radius of curvature of the curved surface, $h1$ denotes a thickness of a central portion of the permanent magnet in the peripheral direction, $W$ denotes a width of the permanent magnet in the peripheral direction, and $g$ denotes an air gap length of the air gap.

Another embodiment of the present invention provides a permanent magnet rotating electric machine including: a stator including a stator core having a plurality of teeth, and an armature winding wound around each of the plurality of teeth to configure the multiple phases; and a rotor including: a rotor core, and a plurality of permanent magnets provided in order in a peripheral direction around the rotor core. The rotor is arranged to be spaced apart from the stator with an air gap therebetween. Each of the permanent magnets has a curved surface opposed to the stator and is configured to satisfy the following relationship:

$$0.40 \leq \frac{h2}{h1} \leq 0.73$$

where $h1$ denotes a thickness of a central portion of the permanent magnet in the peripheral direction, and $h2$ denotes a thickness of an end portion of the permanent magnet in the peripheral direction.

Since a permanent magnet rotating electric machine according to the invention has a plurality of permanent magnets provided in order in the peripheral direction around the rotor core, with a curved surface of the permanent magnet opposed to the stator having a radius of curvature $Rm$, and has the geometry satisfying the relationship $0.65 \leq Rm \times h1/W(h1+g) \leq 1.37$ where the thickness of a central portion of the permanent magnet in the peripheral direction is $h1$, the width of the permanent magnet in the peripheral direction is $W$, and the air gap length between the stator and the rotor is $g$, the cogging torque can be decreased and the irreversible demagnetization can be decreased even by passing current through the armature winding at the high temperature.

Also, since a permanent magnet rotating electric machine according to the invention has a plurality of permanent magnets provided in order in the peripheral direction around the rotor core, with a curved surface of the permanent magnet opposed to the stator, and has the geometry satisfying the relationship $0.40 \leq h2/h1 \leq 0.73$ where the thickness of a central portion of the permanent magnet in the peripheral direction is $h1$ and the thickness of an end portion of the permanent magnet in the peripheral direction is $h2$, the cogging torque can be decreased and the irreversible demagnetization can be decreased even by passing current through the armature winding at the high temperature.

DETAILED DESCRIPTION OF THE INVENTION

Embodiment 1

Figure 1:
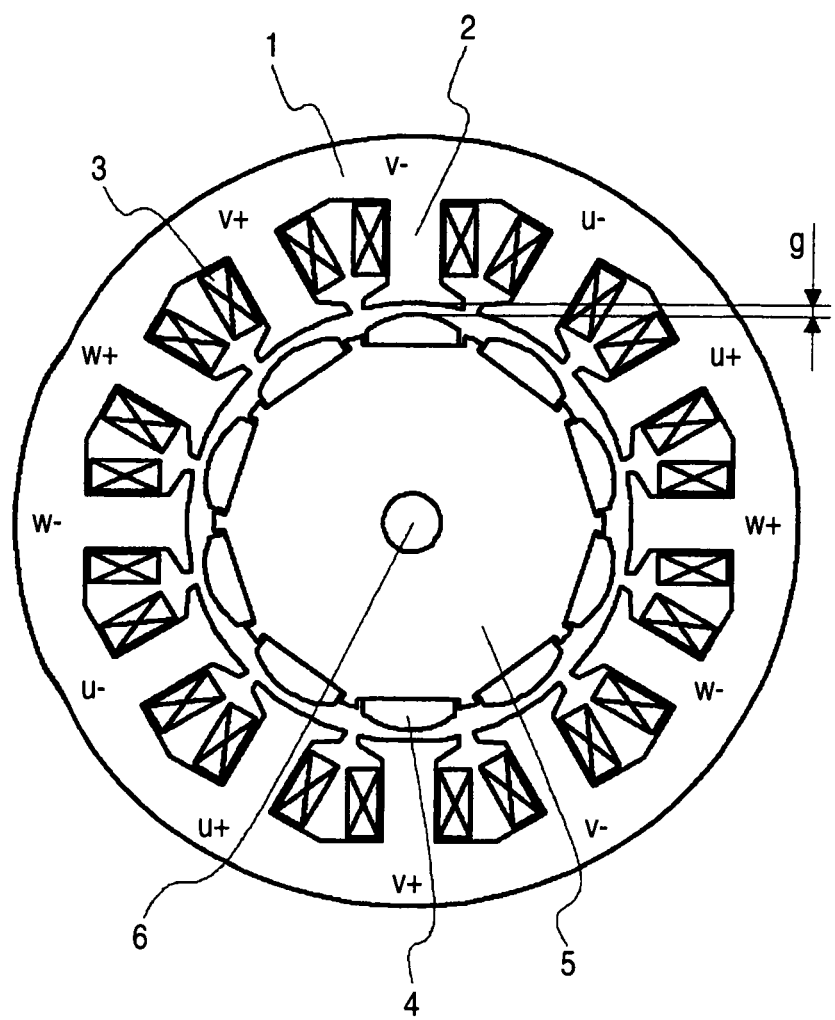
FIG. 1 is a constitutional view of a permanent magnet rotating electric machine according to an embodiment 1 of the present invention.

FIG. 1 is a constitutional view of a permanent magnet rotating electric machine according to an embodiment 1 of the present invention, showing the cross section of the permanent magnet rotating electric machine as seen from the axial direction. In FIG. 1, the permanent magnet rotating electric machine is shown in a simplified form by omitting the detailed parts of a frame or insulator, and a metallic tube for preventing the scattering of magnet. A stator core 1 has teeth 2 projecting inward. The teeth 2 are arranged in the peripheral direction. The permanent magnet rotating electric machine is composed of a stator and a rotor, in which the rotor is arranged to be spaced apart from the stator with an gap of an air gap length g therebetween. The gap length g is defined as the distance between the stator opposed surface of a permanent magnet 4 and the top end of the teeth 2, as shown in FIG. 1. The stator comprises a stator core 1, the teeth 2, and an armature winding 3. The armature winding 3 is wound around each of the plurality of teeth 2 to configure multiple phases. In FIG. 1, twelve teeth 2 are arranged, and the armature winding 3 is wound in concentrated winding around each of the teeth 2.

On the other hand, the rotor comprises the permanent magnet 4, a rotor core 5 and a shaft 6. In FIG. 1, ten permanent magnets 4 are arranged in the peripheral direction around the rotor core 5. In the permanent magnet rotating electric machine of this embodiment, the number of poles is 10 and the number of teeth is 12. Herein, the number of poles is the number of magnetic poles formed by the plurality of permanent magnets 4. Also, the shaft 6 is inserted into a central portion of the rotor core 5. The stator core 1 and the rotor core 5 are made of magnetic material, and produced by laminating the electromagnetic steel plates, for example. The rotor core 5 may be produced by cutting a solid core.

Figure 2:
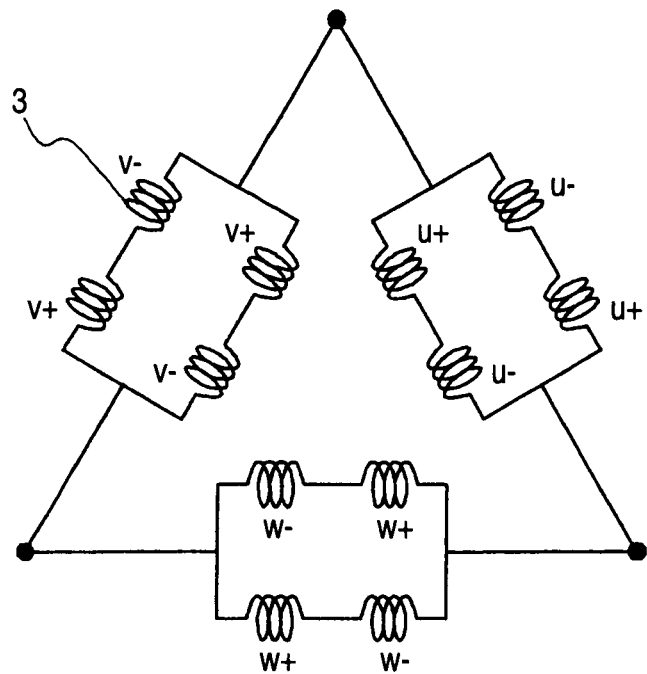
FIG. 2 is a connection diagram of armature windings according to the embodiment 1 of the invention.

There are twelve armature windings 3, which are arranged in the order of U+, U−, V−, V+, W+, W−, U−, U+, V+, V−, W− and W+. Herein, + and − indicate that the winding direction is reverse. With this arrangement, the armature windings 3 are configured in a total of three phases, including the U phase, the V phase and the W phase. In the connection of the armature winding 3, two armature windings connected in series are further connected in parallel to make the connection in each phase, in which the connection in each phase is delta connected, as shown in FIG. 2. The delta connection may be substituted with the star connection, or the armature windings in the connection in each phase may be connected not in parallel but in series. In the case where the permanent magnet rotating electric machine is applied to the electric power steering for automobile, it is mostly driven at a battery voltage of 12 V, and the delta connection has more number of windings by about √3 times than the start connection, so that the line diameter of the armature winding 3 can be thinner accordingly, improving the winding workability. However, when the rotating electric machine is driven at a higher voltage than the battery voltage, the star connection may be used.

In the permanent magnet rotating electric machine with such a configuration, there is a method for making a curved surface of the permanent magnet opposed to the stator like a circular arc to decrease the cogging torque occurring due to an interaction between the permanent magnet and the stator core as described in reference documents 1 and 2. However, in the permanent magnet rotating electric machine in which the curved surface of the permanent magnet opposed to the stator is like a circular arc, the height of an end portion of the permanent magnet in the peripheral direction is smaller, so that the irreversible demagnetization is likely to occur at the end portion of the permanent magnet in the peripheral direction. Also, when the permanent magnet rotating electric machine is operated at the high temperature, the coercive force of the permanent magnet is decreased, whereby the irreversible demagnetization is more likely to occur.

Herein, the relationship between the demagnetization of the permanent magnet and the arrangement of armature windings will be considered. First of all, an inverse magnetic field due to an armature current in which the armature windings in different phases are adjacent will be explained. For example, in the case of the permanent magnet rotating electric machine in which the number of poles is 8 and the number of teeth is 12, the arrangement of the armature windings is in the order of U, V, W, U, V, W, U, V, W, U, V and W. Also, in the case of the permanent magnet rotating electric machine in which the number of poles is 12 and the number of teeth is 9, the arrangement of the armature windings is in the order of U, W, V, U, W, V, U, W and V. In this way, when the different phases are adjacent, even if the maximum current flows through the U phase, the current flowing through adjacent V phase and W phase has as small as half the amplitude of the current flowing through the U phase. Also, the current having the same amplitude flows through the adjacent armature windings, when the current in any phase becomes zero. Considering that three phases are displaced from each other by 120 degrees, the current having the same amplitude has the amplitude of Cos 30° times or √3/2 times the maximum current.

On the other hand, in the case of the permanent magnet rotating electric machine in which the number of poles is 10 and the number of teeth is 12 as in this embodiment, the armature windings 3 wound in the same phase and in reverse direction around the adjacent teeth 2 are arranged, as shown in FIG. 1. For example, U+ and U− are adjacent. With such an arrangement, when the maximum current flows in any phase, a large inverse magnetic field is applied to the permanent magnet 4 near the teeth 2 around which the armature winding 3 is wound in that phase. In terms of the current condition, in the case where the number of poles is 10 and the number of teeth is 12, there is the same effect that a larger current by 3/√2 times=about 1.15 times flows through the armature winding than the armature windings in different phases are adjacent in the case where the number of poles is 8 and the number of teeth is 12. That is, the rotating electric machine in which the number of poles is 10 and the number of teeth is 12, the irreversible demagnetization is more likely to occur about 1.15 times in the current condition than the rotating electric machine in which the number of poles is 8 and the number of teeth is 12. Since the irreversible demagnetization rapidly increases beyond the limit of coercive force, a difference of 1.15 times has an influence on the design.

Figure 3:
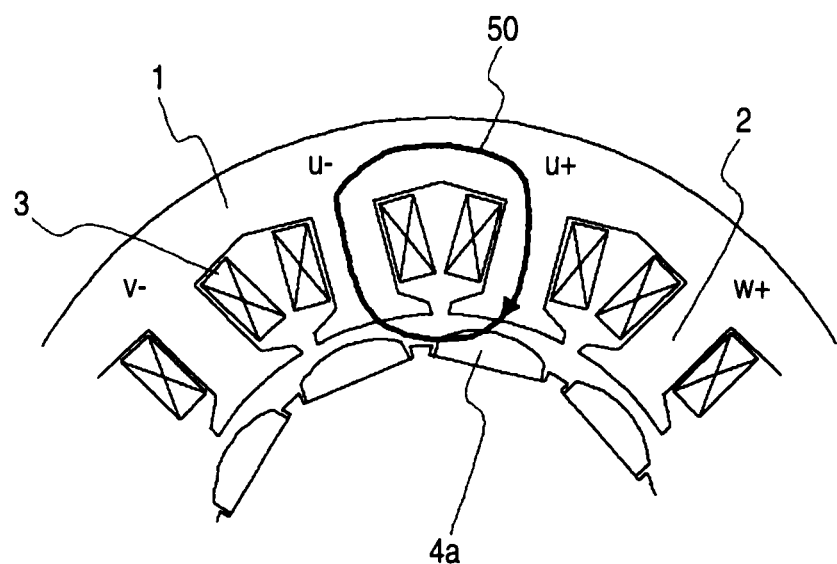
FIG. 3 is a partial enlarged view of the permanent magnet rotating electric machine according to the embodiment 1 of the invention.

Especially in the positional relationship where an end portion of the permanent magnet in the peripheral direction is closer to a part on which this inverse magnetic field is applied, there is a problem that the irreversible demagnetization is likely to occur in the permanent magnet. FIG. 3 is a partial enlarged view of the constitution of the permanent magnet rotating electric machine, as seen from the axial direction. The occurrence of irreversible demagnetization will be described below, using FIG. 3. If the U phase current becomes the maximum, a magneto-motive force of a closed magnetic circuit 50 passing through the teeth of U+ and U− is greater. At this time, since a large inverse magnetic field is applied to an end portion (end portion to the left in FIG. 3) of the permanent magnet 4a in the peripheral direction, the irreversible demagnetization is likely to occur. In the arrangement of armature windings wound in same phase and in reverse direction around the adjacent teeth, the irreversible demagnetization is more likely to occur. Thus, in the invention, the irreversible demagnetization does not occur even in a state where such inverse magnetic field is applied.

Figure 4:
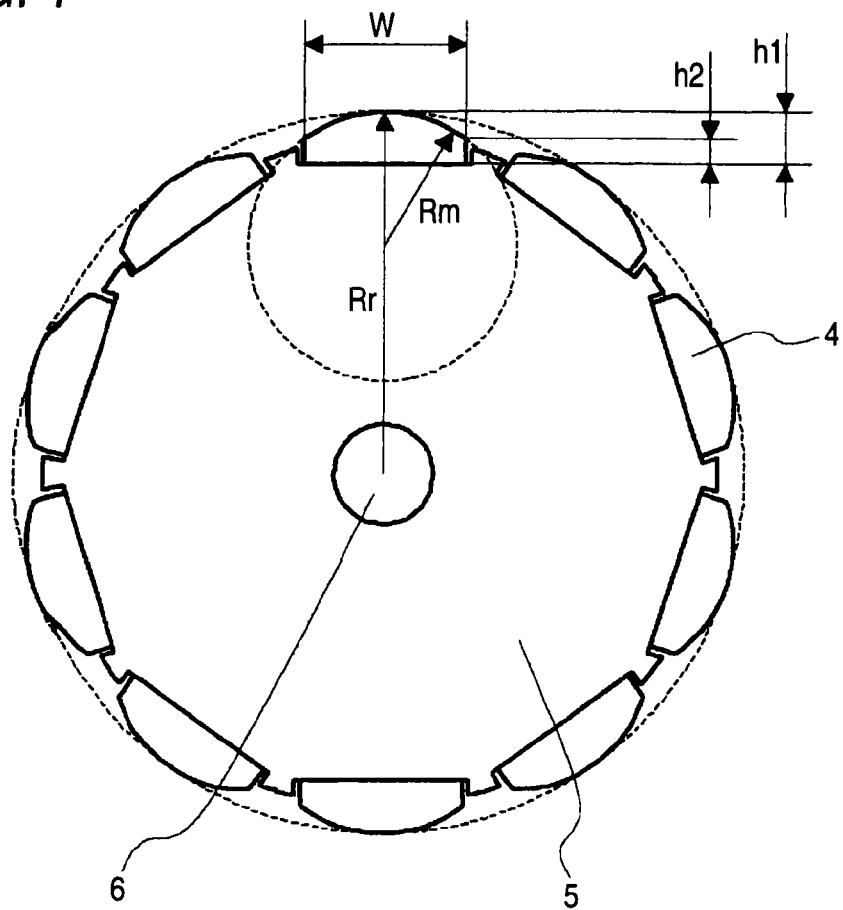
FIG. 4 is a constitutional view of a rotor according to the embodiment 1 of the present invention.

FIG. 4 is a constitutional view of the rotor in which the permanent magnet is arranged according to this embodiment. The permanent magnet 4 has the geometry in which the surface opposed to the stator is like a circular arc. The width of this permanent magnet 4 in the peripheral direction is W, the height of the central portion in the peripheral direction is h1, and the height of the end portion in the peripheral direction is h2. Also, the radius of curvature of circular arc in the permanent magnet 4 is Rm, and the radius (distance from the axial center to the stator opposed surface of the permanent magnet) of the rotor is Rr. In the permanent magnet 4, if the radius of curvature Rm is larger, the height h2 of the end portion in the peripheral direction is larger, whereby the permanent magnet is closer to a plate. This means that if the radius of curvature Rm is larger, the amount of demagnetization at the end portion of the permanent magnet 4 in the peripheral direction is smaller.

Figure 5:
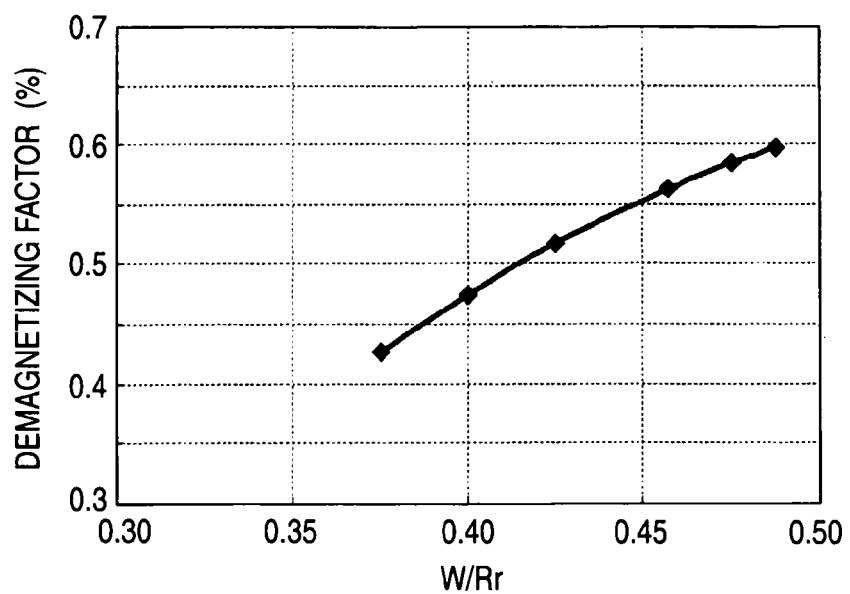
FIG. 5 is a view showing one example of the relationship between the width W of a permanent magnet and a demagnetizing factor.

FIG. 5 shows one example of the relationship between the width W of the permanent magnet and a demagnetizing factor. The demagnetizing factor represents the amount of demagnetization in the permanent magnet, or the percentage of irreversible demagnetization to the magnetic flux density B inside the permanent magnet. In FIG. 5, the width W of permanent magnet is normalized by the radius Rr of the rotor. From FIG. 5, it can be found that as the width of permanent magnet is larger, the demagnetizing factor of permanent magnet is larger. Further, in consideration of an air gap length g between the rotor and the stator, assuming that the residual magnetic flux density of permanent magnet is Br and the magnetic flux density inside the permanent magnet is B, there is the relationship as represented by the expression (1).

[Numerical expression 1]

$$B = \frac{h1/\mu_r}{h1/\mu_r + g} B_r \quad (1)$$

Herein, $\mu_r$ denotes the recoil relative magnetic permeability. $\mu_r$ is a value of about 1.05 for sintered magnet of neodymium rare earth. The expression (1) can be approximated by the expression (2).

[Numerical expression 2]

$$B = \frac{h1}{h1 + g} B_r \quad (2)$$

From the expression (2), as h1/(h1+g) is larger, the magnetic flux density B inside the permanent magnet is larger, whereby it can be found that the irreversible demagnetization of the permanent magnet is less likely to occur. From these, in the invention, the optimal geometry of the permanent magnet is designed, using a demagnetization evaluation parameter as shown in the expression (3) as the parameter for evaluating the irreversible demagnetization of the permanent magnet.

[Numerical expression 3]

$$\frac{Rm h1}{W(h1+g)} \quad (3)$$

Figure 6:
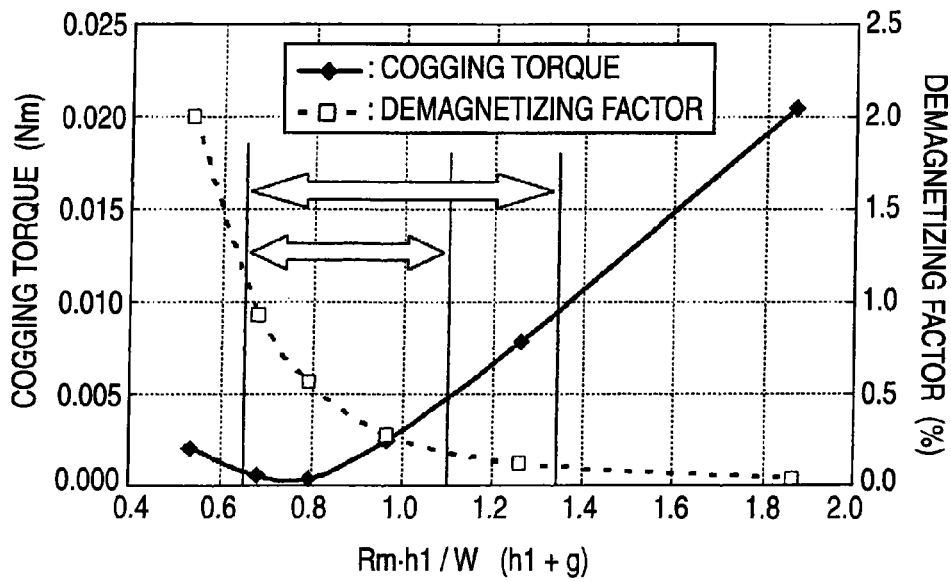
FIG. 6 is a view showing one example of the relationship among a demagnetization evaluation parameter, the cogging torque and the demagnetizing factor of permanent magnet according to the embodiment 1 of the invention.

This demagnetization evaluation parameter is configured by directly multiplying the terms that increase in the amount of demagnetization at the larger value or reciprocally multiplying the terms that decrease in the amount of demagnetization at the larger value. FIG. 6 is a view showing the relationship of the cogging torque and the demagnetizing factor designating the amount of demagnetization of permanent magnet with the demagnetization evaluation parameter. In FIG. 6, the horizontal axis shows the demagnetization evaluation parameter and the vertical axis shows the cogging torque and the demagnetizing factor of permanent magnet. The demagnetization was measured at a magnet temperature of 140° C. and the current was greater than the rated current of the rotating electric machine.

In the case where the permanent magnet rotating electric machine is built into the electric power steering device for automobile, from the viewpoint of steering feeling of the steering wheel, the cogging torque is 0.01 Nm or less, preferably 0.005 Nm or less. On the other hand, from the viewpoint of decreasing the torque or reducing the vibration or noise caused by the increased cogging torque or torque ripple, it is desirable that the demagnetizing factor is 1% or less. To satisfy both conditions, it is required that the demagnetization evaluation parameter of the expression (3) falls within the range as indicated by the expression (4), preferably within the range as indicated by the expression (5), as seen from FIG. 6.

[Numerical expression 4]

$$0.65 \leq \frac{R_m h_1}{W(h_1 + g)} \leq 1.37 \quad (4)$$

[Numerical expression 5]

$$0.65 \leq \frac{R_m h_1}{W(h_1 + g)} \leq 1.12 \quad (5)$$

Figure 7:
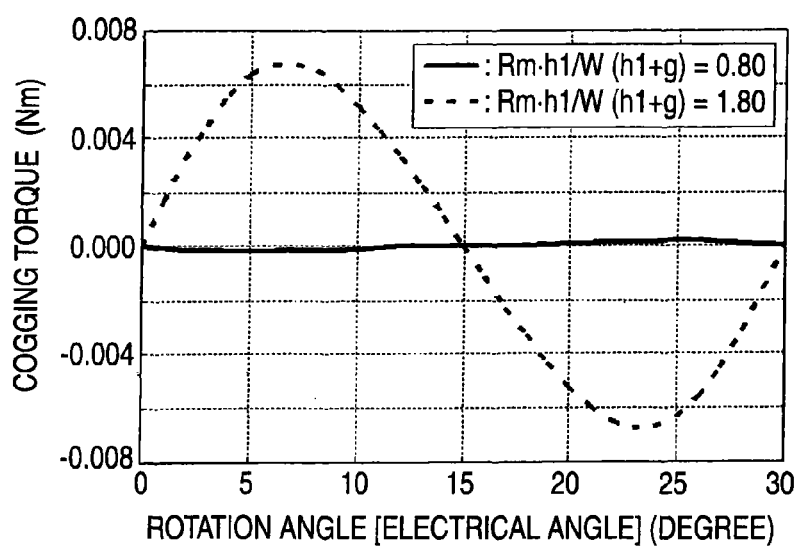
FIG. 7 is a view showing the waveform of cogging torque according to the embodiment 1 of the invention.

FIG. 7 shows an example of the waveform of cogging torque. In FIG. 7, the horizontal axis shows the rotation angle (electrical angle) of the rotor and the vertical axis shows the cogging torque. The comparison is made between the values of demagnetization evaluation parameter of 0.80 and 1.80. At 0.80 within the range as indicated by the expression (4), the cogging torque can be decreased more greatly than at 1.80 outside the range.

Figure 8:
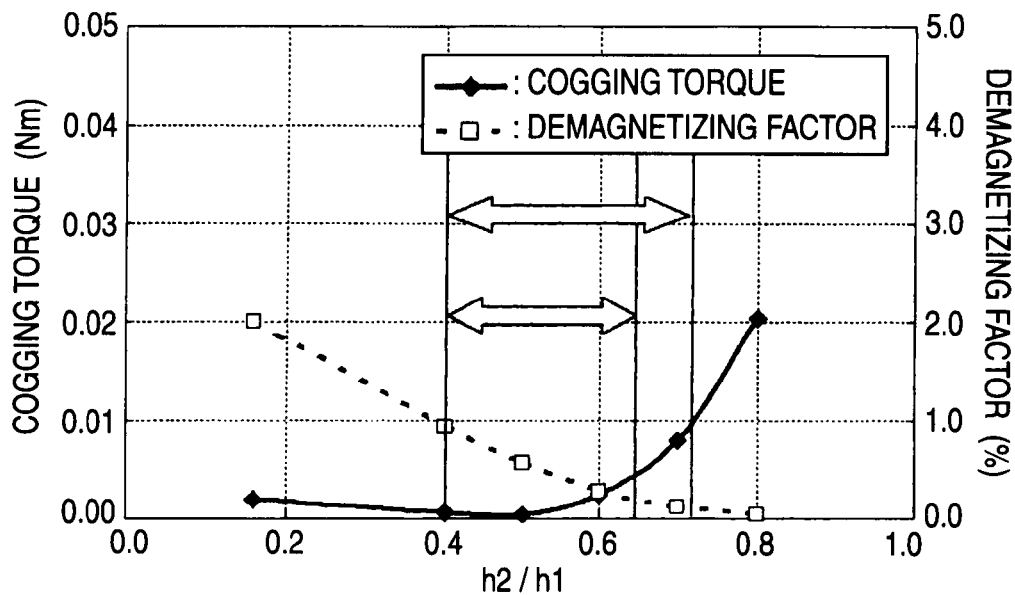
FIG. 8 is a view showing the relationship among the thickness of permanent magnet, the cogging torque and the demagnetizing factor of permanent magnet according to the embodiment 1 of the invention.

Next, the relationship between the geometry of permanent magnet and the irreversible demagnetization of permanent magnet from another viewpoint will be described below. FIG. 8 shows the relationship among the thickness of permanent magnet, the cogging torque and the demagnetizing factor of permanent magnet. In FIG. 8, the horizontal axis shows the ratio h2/h1 of the thickness h1 of the central portion of permanent magnet and the thickness h2 of the end portion in the peripheral direction and the vertical axis shows the cogging torque and the demagnetizing factor indicating the amount of demagnetization of permanent magnet. The cogging torque is 0.01 Nm or less, preferably 0.005 Nm or less, as described above. On the other hand, it is desirable that the demagnetizing factor is 1% or less. To satisfy both conditions, it is required that the thickness ratio h2/h1 falls within the range as indicated by the expression (6), preferably within the range as indicated by the expression (7), as seen from FIG. 8.

[Numerical expression 6]

$$0.40 \leq \frac{h2}{h1} \leq 0.73 \quad (6)$$

[Numerical expression 7]

$$0.40 \leq \frac{h2}{h1} \leq 0.65 \quad (7)$$

With the above constitution, the cogging torque can be decreased as compared with the conventional example. Further, the irreversible demagnetization of permanent magnet can be suppressed. In particular, in the permanent magnet rotating electric machine in which the armature windings are wound in same phase and in reverse direction around the adjacent teeth, the cogging torque can be decreased by applying this invention, though the irreversible demagnetization tended to be larger than adjacent teeth in different phases. Further, the irreversible demagnetization can be decreased by passing current through the armature winding at the high temperature, whereby the torque ripple can be decreased.

In the permanent magnet rotating electric machine in concentrated winding in which the number of poles is 10 and the number of teeth is 12 with the constitution of the embodiment, the winding factor is 0.933. On the contrary, in the permanent magnet rotating electric machine in which the number of poles is 8 and the number of teeth is 12 as conventionally widely used, the winding factor is 0.866. Comparing both, the winding factor is higher with the constitution of this embodiment. Also, the least common multiple of the number of poles and the number of teeth is 60 in the constitution of this embodiment, whereas it is 24 in the case where the number of poles is 8 and the number of teeth is 12 as conventionally widely used, whereby the least common multiple is larger in the constitution of this embodiment. The least common multiple of the number of poles and the number of teeth is the number of ripples in the cogging torque, when the rotor of the rotating electric machine is revolved once. There is a tendency that as the least common multiple is larger, the cogging torque is smaller. Hence, the permanent magnet rotating electric machine with the constitution of this embodiment is the rotating electric machine having smaller cogging torque. Accordingly, with the constitution of this embodiment, the cogging torque can be decreased while the irreversible demagnetization can be decreased as compared with the conventional example. Also, since the number of poles is 10 and the number of teeth is 12, the winding factor can be increased, and the utilization efficiency of the magnetic flux generated by the permanent magnet can be improved, whereby the permanent magnet rotating electric machine with the reduced size and weight and higher efficiency can be obtained.

Embodiment 2

Figure 9A:
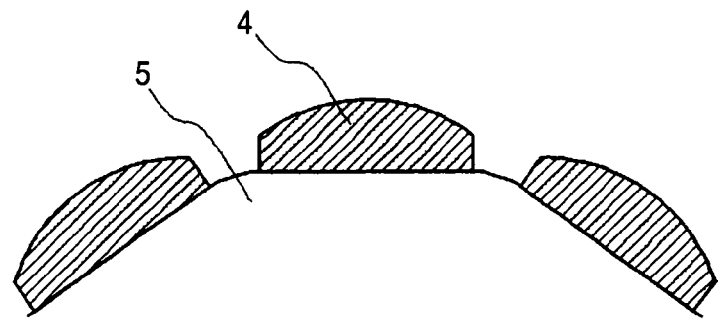
FIGS. 9A and 9B are partial enlarged views of a rotor according to an embodiment 2 of the invention.
Figure 9B:
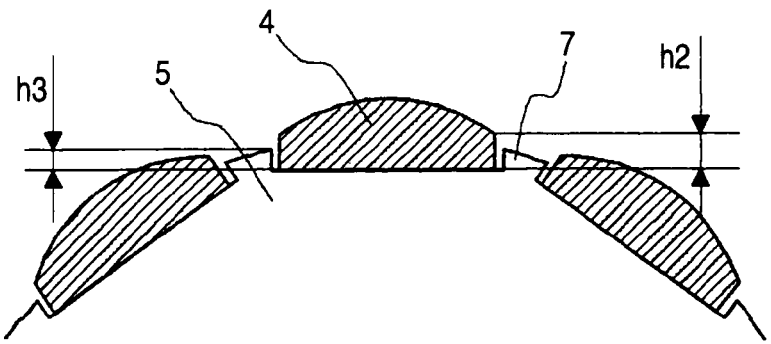

FIGS. 9A and 9B are partially enlarged views of a rotor for a permanent magnet rotating electric machine according to an embodiment 2 of the invention, showing a part of the rotor in cross section as seen from the axial direction. In the permanent magnet rotating electric machine of this embodiment, the shape of the projection portion provided between the adjacent permanent magnets is set more minutely than in the embodiment 1. In FIGS. 9A and 9B, the same reference numerals designate the same or like parts as in FIG. 1, which is common throughout the entire text of the specification. Also, the form of the component represented throughout the entire text of the specification is only illustrative, but not limited to the description.

FIG. 9A shows a case for comparison where the projection portion is not provided and FIG. 9B shows a case where the projection portion 7 is provided between the adjacent permanent magnets 4. This projection portion 7 is made of magnetic material, and projects from the rotor core 5. For example, the projection portion 7 may be formed together in producing the rotor core 5 by stamping an electromagnetic steel plate with mold, or the magnetic material may be added after producing the rotor core 5.

Figure 10:
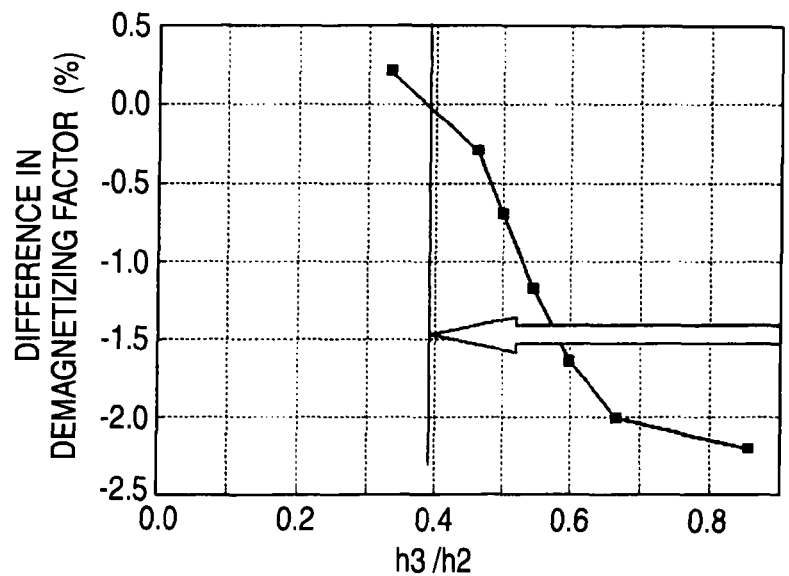
FIG. 10 is a view showing the relationship between the ratio of the height of a projection portion to the height of an end portion of permanent magnet in the peripheral direction and the demagnetizing factor of permanent magnet according to the embodiment 2 of the invention.

Herein, assuming that the height of the projection portion 7 is h3 and the height of the end portion of the permanent magnet 4 in the peripheral direction is h2, the relationship between the ratio h3/h2 and the amount of demagnetization of the permanent magnet will be described below. FIG. 10 shows the relationship between the height ratio h3/h2 and the amount of demagnetization of the permanent magnet. In FIG. 10, the horizontal axis shows the height ratio h3/h2, and the vertical axis shows a difference in the demagnetizing factor indicating the amount of demagnetization of the permanent magnet. The difference in the demagnetizing factor is the difference in the amount of demagnetization for the magnetic flux B inside the permanent magnet. The difference in the amount of demagnetization is a value of subtracting the amount of demagnetization in which the projection portion 7 is not provided from the amount of demagnetization in which the projection portion 7 is provided. If the difference in the amount of demagnetization is the negative value, it is indicated that the irreversible demagnetization can be relieved owing to the effect of the projection portion 7. As seen from FIG. 10, if the height ratio h3/h2 is within the range as indicated by the expression (8), there is no influence of the irreversible demagnetization. To prevent collision with the stator, it is required that the height h3 of the projection portion 7 is set to less than the height h1 of the central portion of the permanent magnet 4 in the peripheral direction.

[Numerical expression 8]

$$\frac{h3}{h2} \geq 0.38 \quad (8)$$

Since a part of the magnetic flux passing from the stator to the end portion of the permanent magnet 4 in the peripheral direction is diverted around the projection portion 7 by providing the projection portion 7 made of magnetic material, the magnetic flux passing the end portion of the permanent magnet 4 in the peripheral direction is decreased. Therefore, the irreversible demagnetization is relieved. With the above constitution, the inverse magnetic field at the end portion of the permanent magnet 4 in the peripheral direction can be relaxed, so that the amount of demagnetization can be decreased. Also, since the projection portion 7 is provided between the adjacent permanent magnets 4, the permanent magnet 4 can be easily positioned.

Embodiment 3

Figure 11:
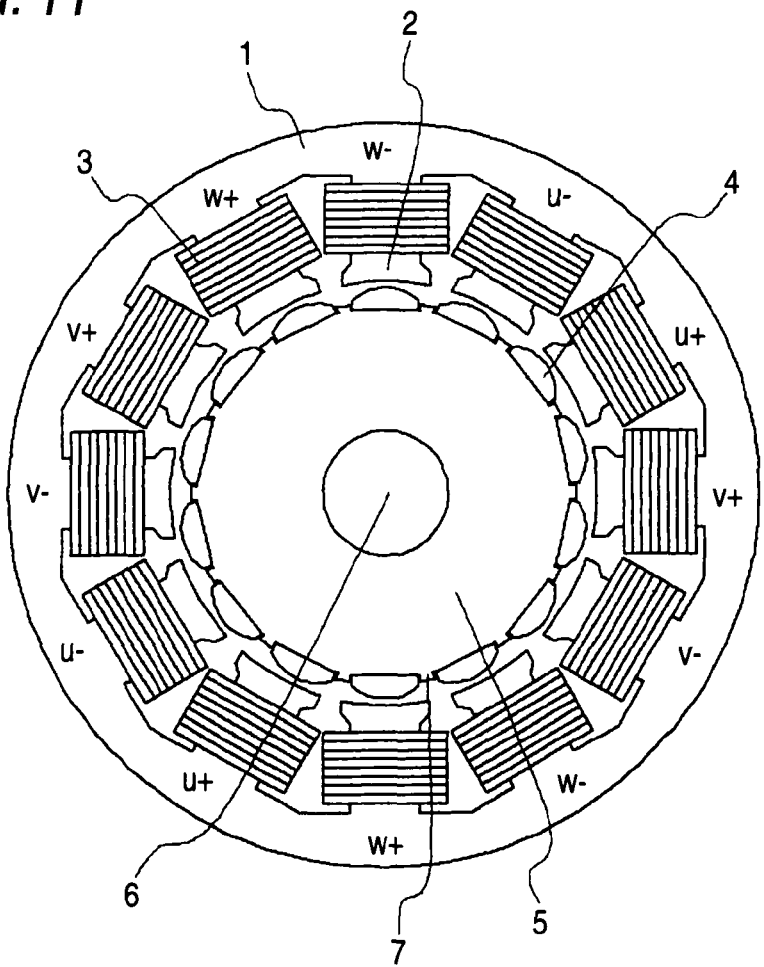
FIG. 11 is a constitutional view of a permanent magnet rotating electric machine according to an embodiment 3 of the invention.
Figure 12:
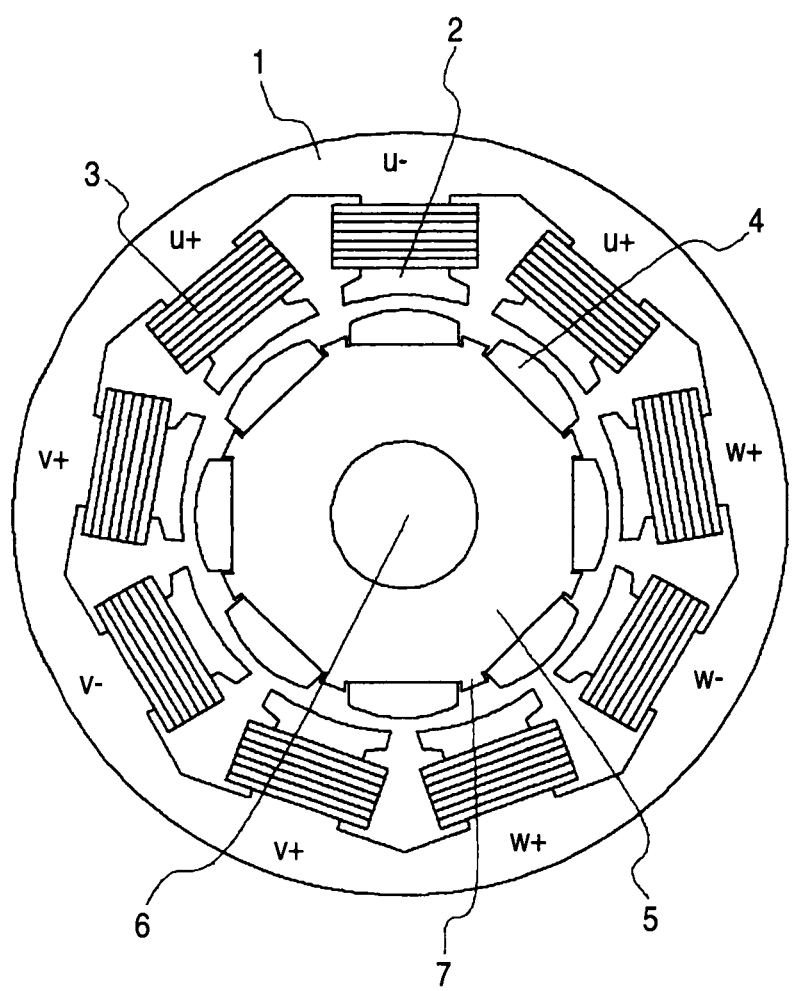
FIG. 12 is a constitutional view of another permanent magnet rotating electric machine according to the embodiment 3 of the invention.

FIGS. 11 and 12 are the constitutional views of a permanent magnet rotating electric machine according to an embodiment 3 of the invention, showing the cross section of the permanent magnet rotating electric machine as seen from the axial direction. The permanent magnet rotating electric machine of this embodiment is different in the number of poles and the number of teeth from the embodiment 1. Though the permanent magnet rotating electric machine in which the number of poles is 10 and the number of teeth is 12 has been described in the embodiment 1, the invention is also applicable to other combinations of the number of poles and the number of teeth.

FIG. 11 shows the permanent magnet rotating electric machine in which the number of poles is 14 and the number of teeth is 12. There are twelve armature windings 3, which are arranged in the order of U+, U−, W−, W+, V+, V−, U−, U+, W+, W−, V− and V+. Herein, + and − indicate that the winding direction is reverse. With this arrangement, the armature windings 3 are configured in a total of three phases, including the U phase, the V phase and the W phase. In the connection of the armature winding 3, two armature windings connected in series are further connected in parallel to make the connection in each phase, in which the connection in each phase is delta connected. The delta connection may be substituted with the star connection, or the armature windings in the connection in each phase may be connected not in parallel but in series.

In this case, since the armature windings 3 are wound in same phase and in reverse direction around the adjacent teeth 2, when the maximum current flows in any phase, a large inverse magnetic field is applied to the permanent magnet 4 to generate the irreversible demagnetization at the end portion of the permanent magnet in the peripheral direction, as described in the embodiment 1. However, in this embodiment, the demagnetization evaluation parameter is set to satisfy the expressions (4) and (5), or the thickness ratio h2/h1 of the permanent magnet is set to satisfy the expressions (6) and (7), as described in the embodiment 1, or the height ratio h3/h2 of the projection portion to the height of the end portion of the permanent magnet in the peripheral direction is set to satisfy the expression (8) as described in the embodiment 2. Thereby, the cogging torque can be decreased as compared with the conventional permanent magnet rotating electric machine. Further, the irreversible demagnetization can be decreased by passing current through the armature winding 3 at the high temperature, whereby the torque ripple can be decreased.

Also, the invention can be applied to other combinations of the number of poles and the number of teeth. FIG. 12 shows the permanent magnet rotating electric machine in which the number of poles is 8 and the number of teeth is 9. In this case, there are nine armature windings 3, which are arranged in the order of U+, U−, U+, V+, V−, V+, W+, W− and W+. Herein, + and − indicate that the winding direction is reverse. U+, U− and U+ are connected in series to configure the U phase. Similarly, three windings are connected in series to configure the V phase and the W phase. And the three phases are delta connected or star connected. Even in this permanent magnet rotating electric machine, since the armature windings 3 wound in same phase and in reverse direction are arranged around the adjacent teeth 2, when the current in any phase becomes maximum, a large inverse magnetic field is applied to the permanent magnet 4. Therefore, with the permanent magnet 4 having the geometry satisfying the expressions (4) to (8), the cogging torque can be decreased as compared with the conventional permanent magnet rotating electric machine. Further, the irreversible demagnetization can be decreased by passing current through the armature winding 3 at the high temperature, whereby the torque ripple can be decreased.

In addition, another permanent magnet rotating electric machine in which the number of poles is 10 and the number of teeth is 9, not shown, can achieve the same effect. Generally, in the permanent magnet rotating electric machine with the number of poles and the number of teeth such that Number of poles:number of teeth=$12n \pm 2n$:$12n$ Number of poles:number of teeth=$9n \pm n$:$9n$ (n: integer of 1 or greater)

the armature windings 3 wound in same phase and in reverse direction are arranged around the adjacent teeth, and with the permanent magnet having the geometry satisfying the expressions (4) to (8), the cogging torque can be decreased. Further, the irreversible demagnetization can be decreased by passing current through the armature winding 3 at the high temperature, whereby the torque ripple can be decreased.

And in the permanent magnet rotating electric machine in concentrated winding in which the number of poles is 14 and the number of teeth is 12, the winding factor is 0.933 and the least common multiple of the number of poles and the number of teeth is 84. Since this value is larger than the permanent magnet rotating electric machine in which the number of poles is 8 and the number of teeth is 12 as conventionally widely used, the constitution of this embodiment has the smaller cogging torque and the larger winding factor than the conventional example, whereby the more efficient permanent magnet rotating electric machine with the reduced size and weight can be produced. Also, in the permanent magnet rotating electric machine in concentrated winding in which the number of poles is 8 and the number of teeth is 9, the winding factor is 0.946 and the least common multiple of the number of poles and the number of teeth is 72. Moreover, in the permanent magnet rotating electric machine in concentrated winding in which the number of poles is 10 and the number of teeth is 9, the winding factor is 0.946 and the least common multiple of the number of poles and the number of teeth is 90. Since these values are larger than the winding factor 0.866 and the least common multiple 36 of the number of poles and the number of teeth in the permanent magnet rotating electric machine in which the number of poles is 12 and the number of teeth is 9 as conventionally widely used, the constitution of this embodiment has the smaller cogging torque and the larger winding factor, whereby the more efficient permanent magnet rotating electric machine with the reduced size and weight can be produced.

From the above, in the permanent magnet rotating electric machine in which the number of poles is 10 and the number of teeth is 12, the permanent magnet rotating electric machine in which the number of poles is 14 and the number of teeth is 12, and the permanent magnet rotating electric machine in which the number of poles is 8 and the number of teeth is 9, the windings wound in same phase and in reverse direction are arranged around the adjacent teeth, and the permanent magnet has the geometry satisfying the expressions (4) to (8), whereby the cogging torque can be decreased. Further, the irreversible demagnetization can be decreased by passing current through the armature winding 3 at the high temperature, whereby the torque ripple can be decreased. Therefore, the invention can be applied to the combinations of the number N of poles and the number M of teeth as represented by the following expression (9), in which the armature windings are wound in same phase and in reverse direction.

[Numerical expression 9]

$$6/7 \leq M/N \leq 6/5 \quad (9)$$

where N and M are different integers. Also, in the conventional permanent magnet rotating electric machine with the combination of the number N of poles and the number M of teeth which does not require that the armature windings are wound in same phase and in reverse direction, the invention has low effect of application. Therefore, the number N of poles and the number M of teeth may be combined within the range as represented by the following expression (10), except for the combinations of the number N of poles and the number M of teeth in the conventional permanent magnet rotating electric machine.

[Numerical expression 10]

$$3/4 < M/N < 3/2 \quad (10)$$

Embodiment 4

Figure 13:
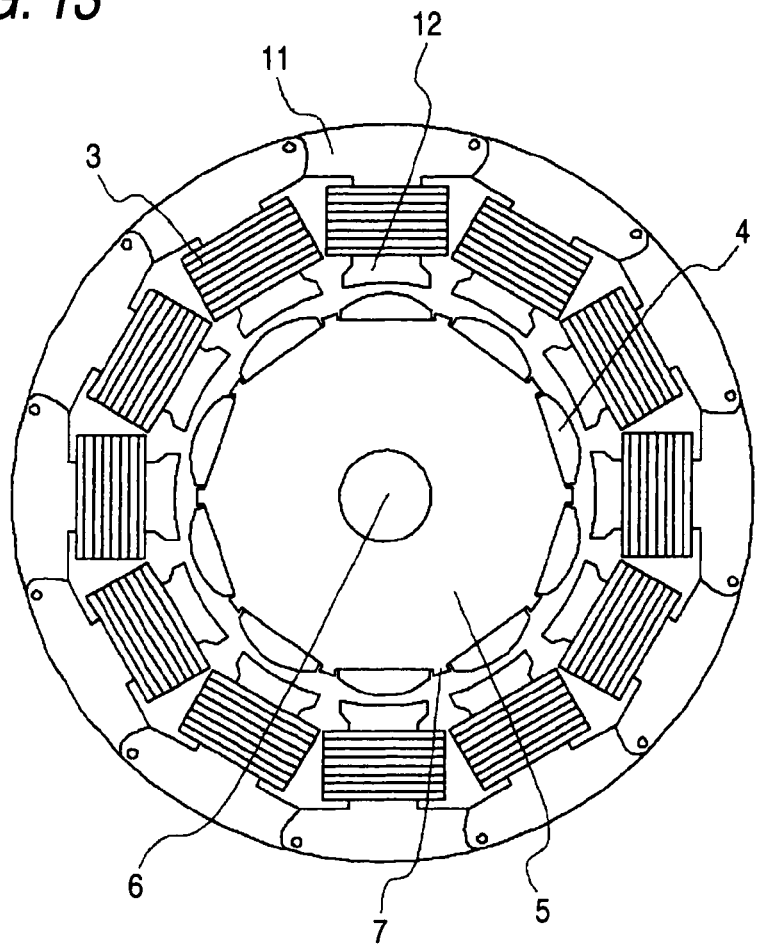
FIG. 13 is a constitutional view of a permanent magnet rotating electric machine according to an embodiment 4 of the invention.

FIG. 13 is a constitutional view of a permanent magnet rotating electric machine according to an embodiment 4 of the invention, showing the cross section of the permanent magnet rotating electric machine as seen from the axial direction. The permanent magnet rotating electric machine of this embodiment is different from the embodiment 1 in that the stator core is constituted by connecting the split iron cores.

The stator core 11 is produced by concatenating the split iron cores in the peripheral direction, not by stamping out a piece with mold. Various production methods are conceived such as splitting the iron core into each tooth 12, as shown in FIG. 13, or stamping out a core back in the shape of a circle and fitting the teeth. In this way, in the case where the stator core 11 is composed of the split iron cores, there is possibility that the precision or roundness of inner peripheral shape of the stator core 11 is worse than stamping out a piece with mold. If the shape precision of the stator core 11 is worse, the cogging torque component with the same number of pulsations as the number of poles occurs every time the rotor is rotated. Accordingly, when used for the electric power steering device requiring the low cogging torque, it is necessary to consider not only the cogging torque of the component occurring at the number of pulsations equivalent to the least common multiple of the number of poles and the number of teeth, but also the cogging torque of the component occurring at the same number of pulsations as the number of poles every rotation.

However, if the permanent magnet 4 has the geometry satisfying the expressions (4) to (8) as described in the embodiment 1, the cogging torque component occurring at the number of pulsations equivalent to the least common multiple of the number of poles and the number of teeth can be sufficiently decreased. Therefore, even if there is the cogging torque component at the same number of pulsations as the number of poles every rotation, the permanent magnet rotating electric machine with low cogging torque can be obtained.

Figure 14:
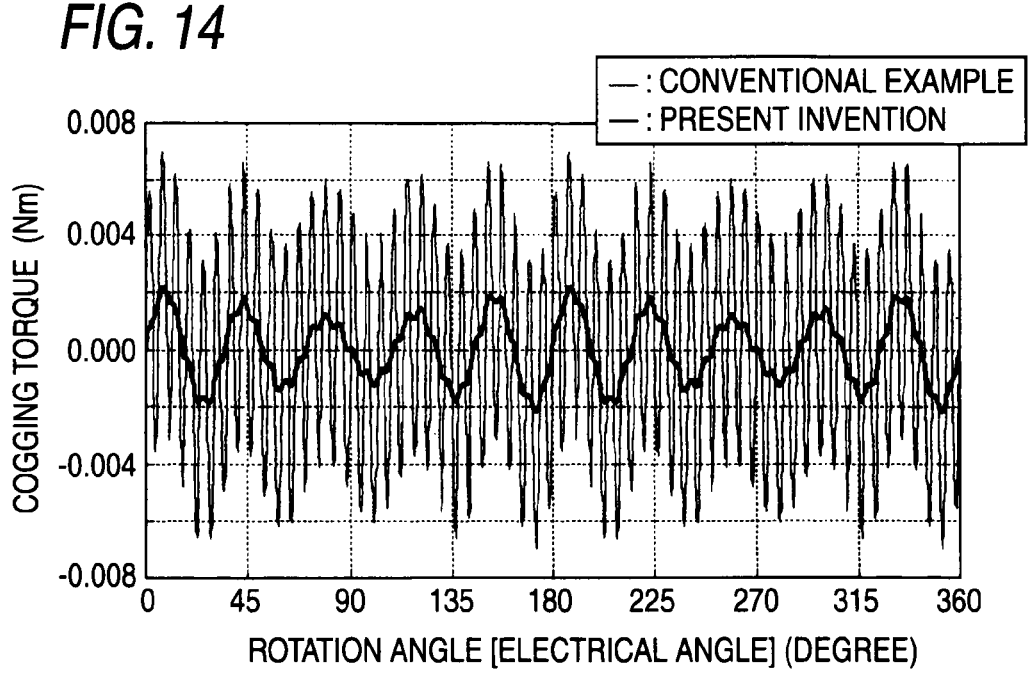
FIG. 14 is a view showing the waveform of cogging torque according to the embodiment 4 of the invention.

FIG. 14 is a view showing a specific example of the waveform of cogging torque for the permanent magnet rotating electric machine in which the number of poles is 10 and the number of teeth is 12, in which the stator core is split. In the conventional permanent magnet rotating electric machine, the cogging torque component having the number of pulsations matched with the least common multiple 60 of the number of poles and the number of teeth and the component pulsating ten times equal to the number of poles every rotation are large, and the amplitude of cogging torque is large. However, in the permanent magnet rotating electric machine of the invention, since the cogging torque component having the number of pulsations matched with the least common multiple 60 can be sufficiently decreased, there is only the component pulsating 10 times almost equal to the number of poles. This indicates that the cogging torque can be suppressed to be sufficiently small, even if the geometry precision of the stator core 11 is bad.

Further, especially if the opening width of slot formed between the plurality of teeth is small by stamping out a piece with mold, it is difficult to put the nozzle of a winding machine for winding the armature winding into the slot, whereby it was difficult to improve the space factor of the armature winding. However, when the stator core 11 is constituted by the split stator core, the space factor of the armature winding 3 can be improved even if the opening width of slot is so small that the copper loss and the coil end are reduced, whereby the rotating electric machine has the reduced size and weight and is more efficient.

Embodiment 5

Figure 15:
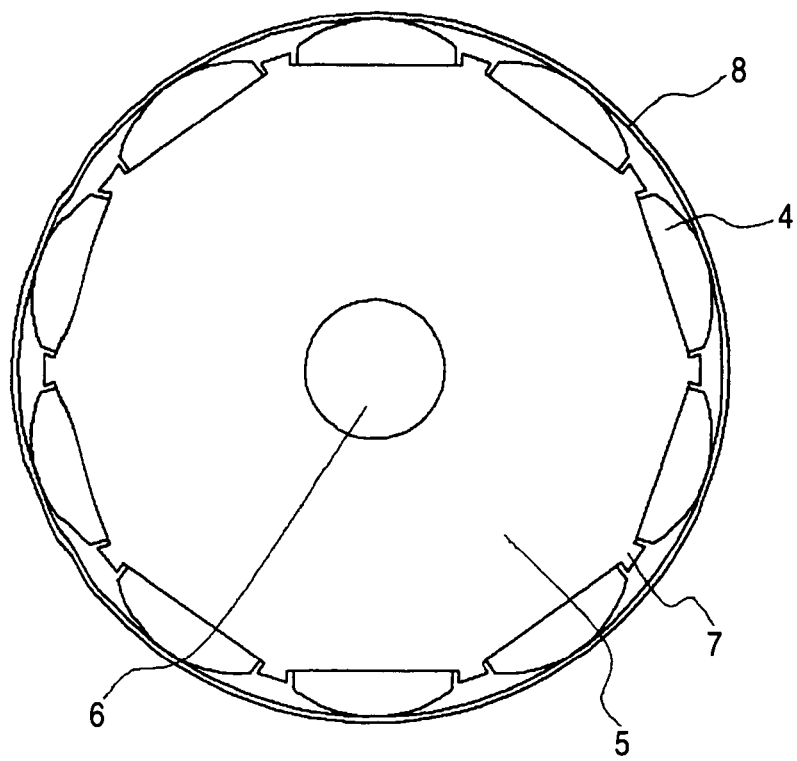
FIG. 15 is a constitutional view of a rotor according to an embodiment 5 of the invention.
Figure 16:
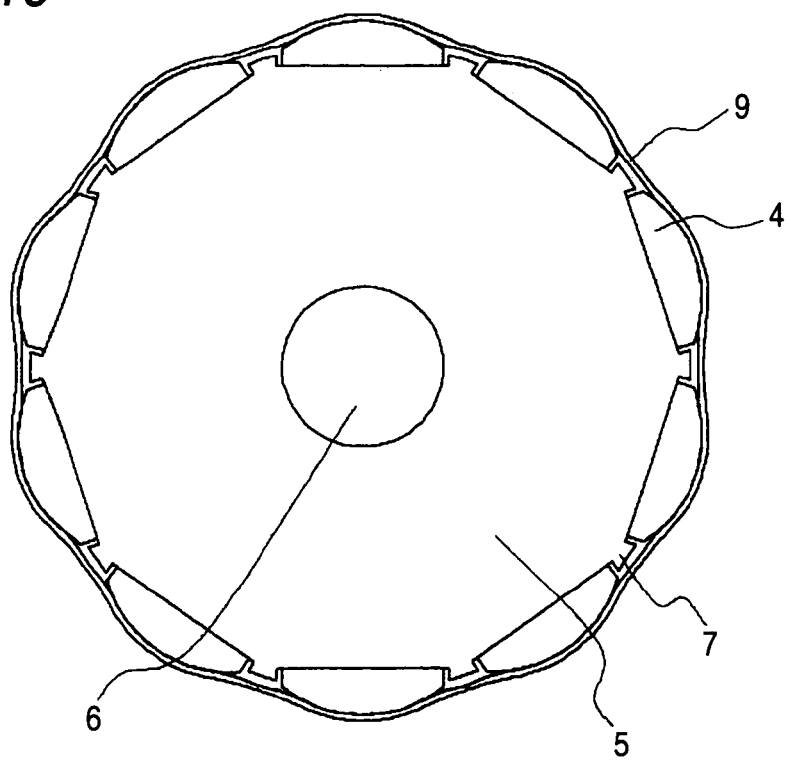
FIG. 16 is a constitutional view of another rotor according to the embodiment 5 of the invention.

FIGS. 15 and 16 are constitutional views of a rotor of a permanent magnet rotating electric machine according to an embodiment 5 of the invention, showing the cross section of the permanent magnet rotating electric machine as seen from the axial direction. The permanent magnet rotating electric machine of this embodiment is different from the embodiment 1 in that a metallic tube for preventing the scattering of permanent magnet is provided around the permanent magnet for the rotor. In FIGS. 15 and 16, the metallic tubes 8 and 9 for preventing the scattering of the permanent magnet 4 are provided to surround the rotor core 5 and the plurality of permanent magnets 4. The metallic tube has a role of preventing the scattering of the permanent magnet 4 due to a centrifugal force when the rotor is rotated at high speed.

Figure 17:
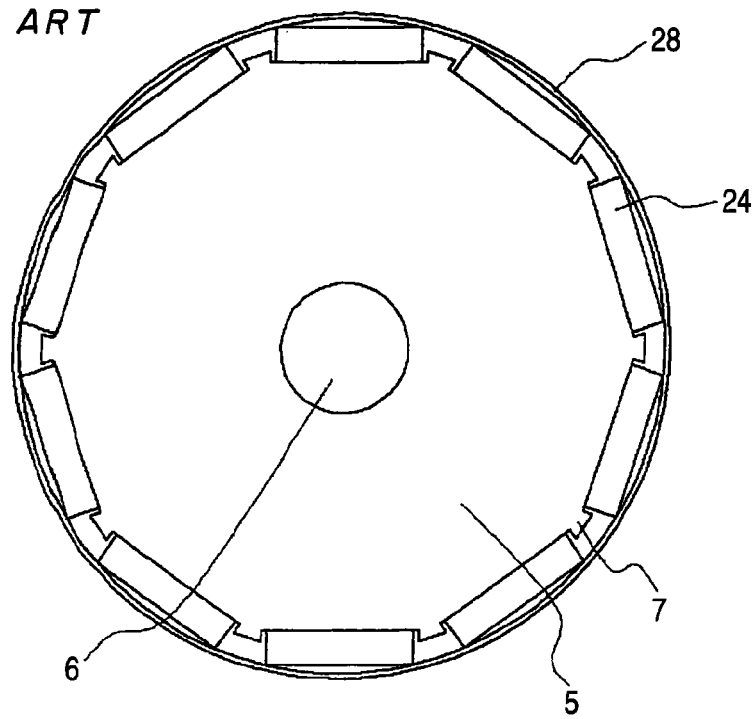
FIG. 17 is a constitutional view of the conventional rotor.

FIG. 17 is a constitutional view of the conventional permanent magnet rotating electric machine in which a metallic tube 28 is provided around the periphery of a permanent magnet 24 for the rotor. The cross-sectional shape of the permanent magnet 24 as seen from the axial direction is rectangular, in which the permanent magnet 24 is protected by the metallic tube 28 in contact with a part of the corner of the permanent magnet 24. If a centrifugal force is applied, a strong stress is concentrated on the part in contact with the corner of the permanent magnet 24, causing a problem that the metallic tube 28 is easy to break. Since the corner of the permanent magnet 24 is acute, the metallic tube 28 is easily bruised in the manufacturing process, resulting in a problem that the tube is easy to break due to this bruise. In particular, when the cross-sectional shape of the permanent magnet 24 is rectangular, the maximum outer diameter of the rotor including the permanent magnet 24 becomes the part of the corner of the permanent magnet 24, so that the metallic tube 28 is easy to contact this corner.

However, the curved surface of the permanent magnet 4 opposed to the stator is like a circular arc, and the permanent magnet 4 has the geometry satisfying the expressions (4) to (8), as described in the embodiment 1, whereby the contact area between the permanent magnet 4 and the metallic tube 8 can be increased, relaxing the stress, as shown in FIG. 15. Therefore, the metallic tube 8 is not easily bruised due to a centrifugal force. Also, the metallic tube 8 is not easily bruised in the manufacturing process. For these reasons, the metallic tube 8 has a structure that can withstand the centrifugal force even if it is made thin. For example, the metallic tube 8 can be formed of the stainless tube of 0.2 mm or less, or further 0.1 mm or less. By making the metallic tube 8 thinner, the air gap length between the rotor and the stator of the permanent magnet rotating electric machine can be reduced, so that the sufficient magnetic flux can be generated with the small permanent magnet 4, whereby the amount of using the material for the permanent magnet 4 can be reduced. As a result, the permanent magnet rotating electric machine can be reduced in size and weight and be more efficient. Even if the metallic tube 8 is provided, the air gap length g is defined as the distance between the stator opposed surface of the permanent magnet 4 and the top end of the teeth 2.

Also, FIG. 16 is a constitutional view of a rotor of the permanent magnet rotating electric machine in which the metallic tube is not cylindrical but roughly polygonal in cross section. The metallic tube 9, which is roughly polygonal in cross section, has the geometry conforming to the geometry of the permanent magnet 4 in a part corresponding to the circular arc part of the permanent magnet 4 and almost straight between the adjacent permanent magnets. With such geometry, the permanent magnets 4 are contacted and connected by the metallic tube 9, increasing the contact area between the metallic tube 9 and the permanent magnet 4, whereby even if the metallic tube 9 and the permanent magnet 4 generate heat due to eddy currents, the local temperature rise of the permanent magnet 4 is alleviated to improve the demagnetization resistance of the permanent magnet 4. Further, since the contact area between the metallic tube 9 and the permanent magnet 4 is increased, the stress is relaxed, so that the metallic tube is stronger to the centrifugal force at high speed rotation.

In FIG. 16, the metallic tube 9 is in contact with most of the circular arc part of the permanent magnet 4 conforming to the geometry of the permanent magnet 4, but the geometry of the metallic tube is not limited to this. For example, it may be in contact with some of the circular arc part of the permanent magnet 4. If the contact area with the permanent magnet 4 is larger than the metallic tube 8 as shown in FIG. 15, it is needless to say that the local temperature rise is alleviated even though there is heat generation due to eddy currents.

Further, if the metallic tube is stainless, there is no influence on the magnetic circuit even with the polygonal shape in cross section, not causing the generation of cogging torque, whereby the permanent magnet rotating electric machine with low cogging torque can be produced.

Embodiment 6

Figure 18:
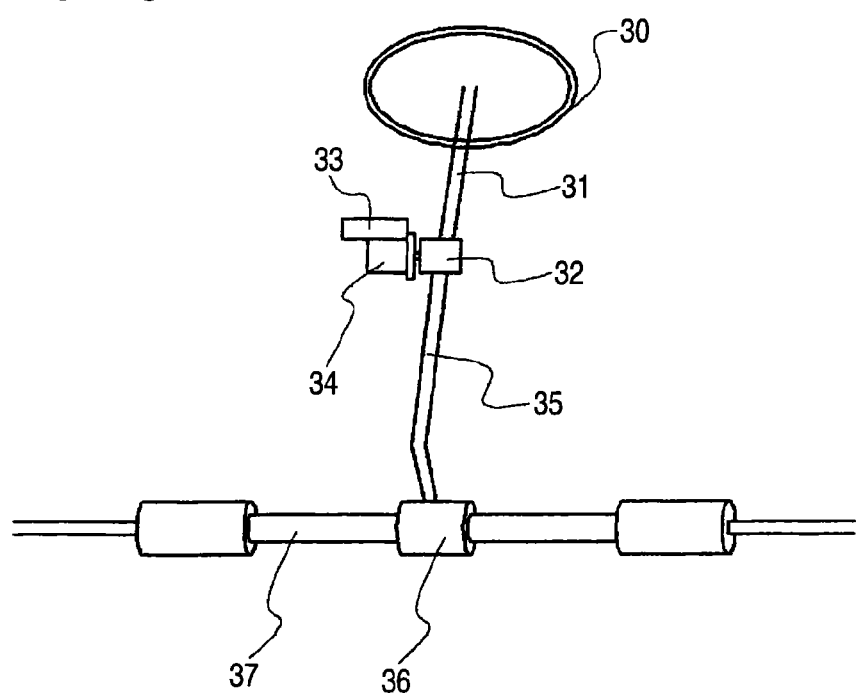
FIG. 18 is a concept view of an electric power steering device for vehicle using a permanent magnet rotating electric machine according to an embodiment 6 of the invention.

FIG. 18 is a concept view of an electric power steering device for vehicle using a permanent magnet rotating electric machine according to an embodiment 6 of the invention. In FIG. 18, the electric power steering device is provided with a column shaft 31 for transmitting a steering effort from a steering wheel 30. The column shaft 31 is connected to a worm gear 32 (the details are omitted but a gear box only is shown in FIG. 18) that transmits the output (torque, rpm) of a motor 34 driven under a controller 33 by changing the rotational direction orthogonally, and at the same time slows down to increase an assist torque. Reference numeral 35 denotes a handle joint for transmitting a steering effort and changing the rotational direction. Reference numeral 36 denotes a steering gear (the details are omitted and the gear box only is shown in FIG. 18) that decelerates the rotation of the column shaft 31 and at the same time converts it to the linear motion of a rack 37 to obtain a desired displacement. With the linear motion of this rack 37, the wheel can be moved to change the direction of the vehicle.

In such electric power steering device, a pulsation of torque generated by the motor 34 is transmitted via the worm gear 32 and the column shaft 31 to the steering wheel 30. Accordingly, when the motor 34 generates a large torque pulsation, a smooth steering feeling can not be obtained. Also, if the electric motor generates a large cogging torque even in a state where it does not generate the torque for assist, the smooth steering feeling can not be obtained.

However, the cogging torque can be decreased by incorporating the permanent magnet rotating electric machine according to the invention as the motor 34 of the electric power steering device of this embodiment. Also, since the irreversible demagnetization hardly occurs even by passing current through the armature winding of the motor 34 at the high temperature, the torque ripple causing the vibration or noise is also decreased. Therefore, the steering feeling in the electric power steering device can be improved.

Also, since it is required that the motor for the electric power steering device has the smaller size and the decreased amount of using the permanent magnet, the magnetic air gap length between the rotor and the stator is mostly designed to be 1 mm or less. With such small air gap length, if the geometry of the permanent magnet is not appropriate, the irreversible demagnetization may occur at the temperature as high as 140° C., for example. In particular, in the permanent magnet rotating electric machine with the relationship Number of poles:number of teeth=$12n\pm2n$:$12n$ Number of poles:number of teeth=$9n\pm n$:$9n$ (n: integer of 1 or greater)
the windings wound in same phase and in reverse direction is arranged around the adjacent teeth, whereby the irreversible demagnetization is a problem. However, if the permanent magnet rotating electric machine as described in the embodiments 1 to 5 is employed for the electric power steering device, the irreversible demagnetization hardly occurs in the permanent magnet, and the cogging torque can be smaller, whereby the steering feeling can be improved. Also, the minimum common multiple of the number of poles and the number of teeth is larger and the winding factor is also larger than the conventional permanent magnet rotating electric machine, and the cogging torque can be decreased, whereby the more efficient permanent magnet rotating electric machine with the reduced size and weight can be produced.

What is claimed is:
1. A permanent magnet rotating electric machine comprising:
a stator including:
   a stator core having a plurality of teeth; and
   an armature winding wound around each of the plurality of teeth to configure multiple phases, wherein the armature windings are wound in same phase and in reverse directions around adjacent teeth;
a rotor having a radius Rr and including:
   a rotor core; and
   a plurality of permanent magnets provided in order in a peripheral direction around the rotor core; and
a roughly polygonal metal tube surrounding the rotor,
wherein the rotor is arranged to be spaced apart from the stator with an air gap therebetween, and
wherein each of the permanent magnets has a curved surface opposed to the stator and is configured to satisfy the following relationship:

$$0.65 \le \frac{Rm \times h1}{W(h1+g)} \le 1.37$$

where Rm denotes a radius of curvature of the curved surface, h1 denotes a thickness of a central portion of the permanent magnet in the peripheral direction, W denotes a width of the permanent magnet in the peripheral direction, and g denotes an air gap length of the air gap,
wherein Rm<Rr, and wherein the roughly polygonal metal tube surrounding the rotor engages the curved surfaces of the permanent magnets opposed to the stator over the majority of the circumferential length of each of the permanent magnets and does not follow a circular arc, centered on the center of radius Rr, at the circumferential locations of the permanent magnets over the majority of the circumferential length of each of the permanent magnets, such that the roughly polygonal metal tube surrounding the rotor follows a convex circular arc centered on the center of radius Rm inside the metal tube over the majority of the circumferential length of each of the permanent magnets, wherein the rotor core includes a projection portion, and wherein the roughly polygonal metal tube does not engage with the projection portion of the rotor core,
wherein the rotor core is polygonal, each of said permanent magnets being provided on one of the polygonal surfaces, wherein the projection portion is provided between two adjacent permanent magnets, is made of magnetic substance and projects from the polygonal surfaces to which said two adjacent permanent magnets are provided, wherein the projection portion and each of the permanent magnets are configured to satisfy the following relationships, $h3/h2 \ge 0.38$ and $h1 \ge h3$ where h1 is as previously denoted, h2 denotes a thickness of an end portion of the curved surface of the permanent magnet in the peripheral direction, and h3 denotes a height of the projection portion relative to the polygonal surfaces to which said two of the permanent magnets are provided.

2. The permanent magnet rotating electric machine according to claim 1, wherein the following relationship is satisfied $6/7 \le M/N \le 6/5$ where N denotes a number of magnetic poles formed by the plurality of permanent magnets, and M denotes a number of the teeth.

3. The permanent magnet rotating electric machine according to claim 1, wherein the following relationship is satisfied $3/4 < M/N < 3/2$ where N denotes a number of magnetic poles formed by the plurality of permanent magnets, and M denotes a number of the teeth.

4. The permanent magnet rotating electric machine according to claim 1, wherein the following relationship is satisfied $N:M=12n\pm2n:12n$ (n is an integer of 1 or greater)

where N denotes a number of magnetic poles formed by the plurality of permanent magnets, and M denotes a number of the teeth.

5. The permanent magnet rotating electric machine according to claim 1, wherein the following relationship is satisfied $N:M=9n\pm n:9n$ (n is an integer of 1 or greater)

where N denotes a number of magnetic poles formed by the plurality of permanent magnets, and M denotes a number of the teeth.

6. The permanent magnet rotating electric machine according to claim 1, wherein the stator core is configured by a plurality of split iron cores.

7. A permanent magnet rotating electric machine comprising:
a stator including:
   a stator core having a plurality of teeth; and
   an armature winding wound around each of the plurality of teeth to configure multiple phases, wherein the armature windings are wound in same phase and in reverse directions around adjacent teeth; and a rotor having a radius Rr and including:
a rotor core;
a plurality of permanent magnets provided in order in a peripheral direction around the rotor core; and
a roughly polygonal metal tube surrounding the rotor,
wherein the rotor is arranged to be spaced apart from the stator with an air gap therebetween,
wherein each of the permanent magnets has a curved surface opposed to the stator and is configured to satisfy the following relationship:

$$0.40 \leq \frac{h2}{h1} \leq 0.73$$

where h1 denotes a thickness of a central portion of the permanent magnet in the peripheral direction, and h2 denotes a thickness of an end portion of the curved surface of the permanent magnet in the peripheral direction,
wherein Rm<Rr, where Rm denotes a radius of curvature of the curved surface, and wherein the roughly polygonal metal tube surrounding the rotor engages the curved surfaces of the permanent magnets opposed to the stator over the majority of the circumferential length of each of the permanent magnets and does not follow a circular arc, centered on the center of radius Rr, at the circumferential locations of the permanent magnets over the majority of the circumferential length of each of the permanent magnets, such that the roughly polygonal metal tube surrounding the rotor follows a convex circular arc centered on the center of radius Rm inside the metal tube over the majority of the circumferential length of each of the permanent magnets, wherein the rotor core includes a projection portion, and wherein the roughly polygonal metal tube does not engage with the projection portion of the rotor core,
wherein the rotor core is polygonal, each of said permanent magnets being provided on one of the polygonal surfaces, wherein the projection portion is provided between two adjacent permanent magnets, is made of magnetic substance and projects from the polygonal surfaces to which said two adjacent permanent magnets are provided, wherein the projection portion and each of the permanent magnets are configured to satisfy the following relationships, $h3/h2 \geq 0.38$ and $h1 \geq h3$ where h1 and h2 are as previously denoted, and h3 denotes a height of the projection portion relative to the polygonal surfaces to which said two of the permanent magnets are provided.

8. The permanent magnet rotating electric machine according to claim 7, wherein the following relationship is satisfied $6/7 \leq M/N \leq 6/5$ where N denotes a number of magnetic poles formed by the plurality of permanent magnets, and M denotes a number of the teeth.

9. The permanent magnet rotating electric machine according to claim 7, wherein the following relationship is satisfied $3/4 < M/N < 3/2$ where N denotes a number of magnetic poles formed by the plurality of permanent magnets, and M denotes a number of the teeth.

10. The permanent magnet rotating electric machine according to claim 7, wherein the following relationship is satisfied $N:M=12n \pm 2n:12n$ (n is an integer of 1 or greater)

where N denotes a number of magnetic poles formed by the plurality of permanent magnets, and M denotes a number of the teeth.

11. The permanent magnet rotating electric machine according to claim 7, wherein the following relationship is satisfied $N:M=9n \pm n:9n$ (n is an integer of 1 or greater)

where N denotes a number of magnetic poles formed by the plurality of permanent magnets, and M denotes a number of the teeth.

12. The permanent magnet rotating electric machine according to claim 7, wherein the stator core is configured by a plurality of split iron cores.

13. The permanent magnet rotating electric machine according to claim 1, wherein the upper limit of the demagnetization evaluation parameter (Rm·h1)/(W(h1+g)) is 1.12.

14. The permanent magnet rotating electric machine according to claim 1, wherein the roughly polygonal metal tube is almost straight at circumferential locations between the permanent magnets.

15. The permanent magnet rotating electric machine according to claim 7, wherein the roughly polygonal metal tube is almost straight at circumferential locations between the permanent magnets.

* * * * *